United States Patent [19]

Kobayashi

[11] Patent Number: 4,531,407
[45] Date of Patent: Jul. 30, 1985

[54] FUEL GAUGE FOR AN AUTOMOTIVE VEHICLE

[75] Inventor: Hiroshi Kobayashi, Yokohama, Japan

[73] Assignee: Nissan Motor Company, Limited, Japan

[21] Appl. No.: 563,273

[22] Filed: Dec. 19, 1983

Related U.S. Application Data

[63] Continuation of Ser. No. 292,164, Aug. 12, 1981, abandoned.

[30] Foreign Application Priority Data

Oct. 16, 1980 [JP] Japan ............................ 55-146445[U]

[51] Int. Cl.³ ............................................. G01F 23/26
[52] U.S. Cl. ................................. 73/304 C; 73/290 R
[58] Field of Search ................ 340/620; 361/284, 286; 324/61 P; 73/304 G; 364/509

[56] References Cited

U.S. PATENT DOCUMENTS

| 2,700,901 | 2/1955 | Rickner | 73/304 C |
| 4,199,984 | 4/1980 | Huddart et al. | 73/304 C |
| 4,296,472 | 10/1981 | Sarkis | 364/509 |

FOREIGN PATENT DOCUMENTS

| 2349748 | 10/1973 | Fed. Rep. of Germany . |
| 1117409 | 6/1968 | United Kingdom . |
| 1151798 | 5/1969 | United Kingdom . |
| 1318512 | 5/1973 | United Kingdom . |
| 1562138 | 3/1980 | United Kingdom . |
| 2059596 | 4/1981 | United Kingdom . |

Primary Examiner—Charles E. Frankfort
Assistant Examiner—David R. Schuster
Attorney, Agent, or Firm—Lowe, King, Price & Becker

[57] ABSTRACT

A fuel gauge includes a stationary capacitor located within a fuel tank in such a manner as to be partially immersed in the fuel so that the capacitance of the capacitor varies with the level of fuel. A measuring device determines the capacitance of the capacitor to measure the level of the fuel or the amount of fuel remaining within the tank.

15 Claims, 7 Drawing Figures

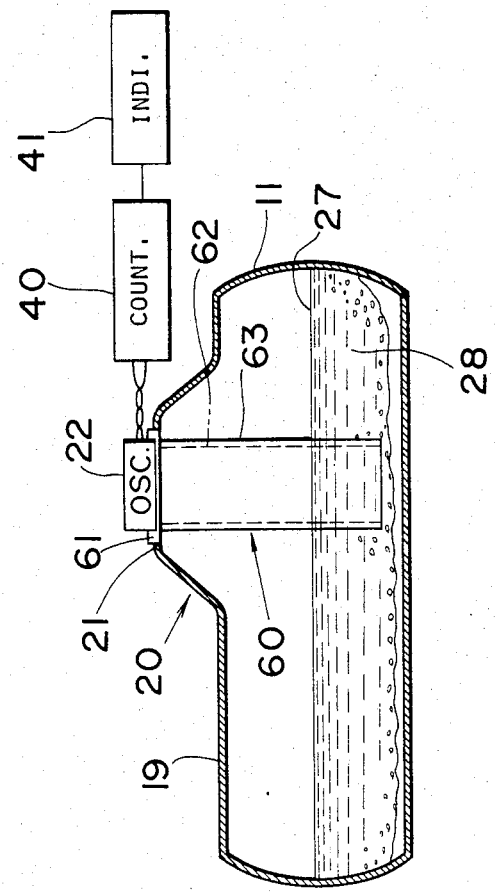

FUEL GAUGE FOR AN AUTOMOTIVE VEHICLE

This application is a continuation of application Ser. No. 292,164, filed Aug. 12, 1981 and now abandoned.

BACKGROUND OF THE INVENTION

This invention relates to a fuel gauge for an automotive vehicle, which includes a stationary capacitor located within a fuel tank in such a manner as to be partially immersed in the fuel so that the capacitance of the capacitor may vary with the level of fuel, and a measuring device for determining the capacitance of the capacitor to measure the amount of fuel remaining in the tank.

SUMMARY OF THE INVENTION

It is an object of the present invention to provide an accurate and stable fuel gauge for an automotive vehicle.

The fuel gauge of the present invention has a tank containing fuel and a capacitor located within the tank. The capacitor consists of first and second conductive elements so arranged as to have a gap therebetween to be insulated from each other. The capacitor is adapted to admit fuel into the gap thereof so that the capacitance of the capacitor varies with the position of the surface of the fuel. The gap of the capacitor is of a predetermined size allowing water droplets to fall out of the gap within a relatively short time if they enter the gap. A measuring device is electrically connected to the capacitor to determine the time-averaged capacitance thereof.

The above and other objects, features and advantages of the present invention will be apparent from the following description of preferred embodiments thereof, taken in conjunction with the drawings.

BRIEF DESCRIPTION OF THE DRAWINGS

FIG. 7 is a diagrammatic sectional view of a fuel gauge according to a second embodiment of the present invention.

DESCRIPTION OF THE PREFERRED EMBODIMENTS

Figure 1:
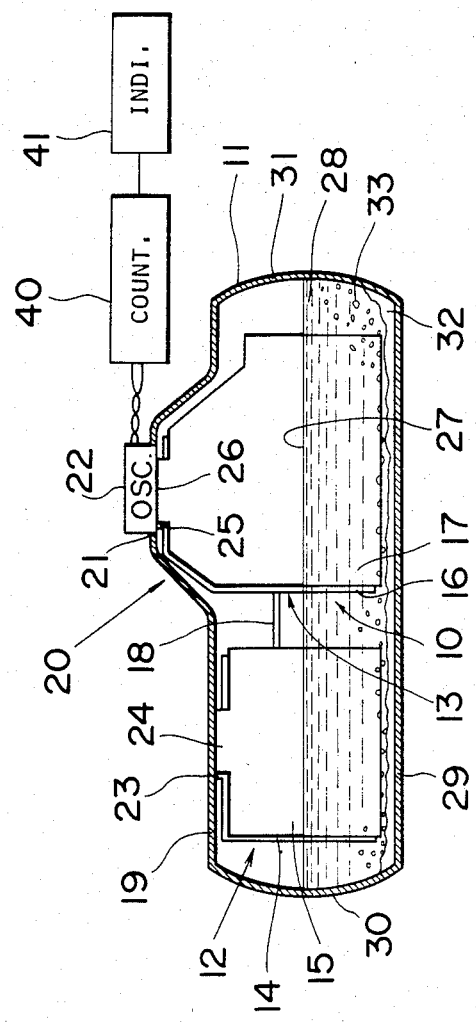
FIG. 1 is a diagrammatic sectional view of a fuel gauge according to a first embodiment of the present invention.

With reference to FIG. 1, a fuel gauge of the first embodiment of the present invention has a capacitor 10 located within a fuel tank 11. The capacitor 10 consists of first and second sections 12 and 13 each of which is made up of a pair of identical flat plates 14 and 15, or 16 and 17 as the pair of conductive elements for the capacitor. Each pair of plates 14 and 15, or 16 and 17 are arranged parallel to each other by means of insulating spacers (not shown) to form therebetween a predetermined gap so as to be insulated from each other. The first and second sections 12 and 13 are attached to each other by connecting the plate 14 to the plate 16, and the plate 15 to the plate 17 electrically by means of harness 18. Thus the capacitance of the capacitor 10 is the sum of the capacitances of the first and second sections 12 and 13.

The top 19 of the tank 11 protrudes partially upward to form a projection 20 of trapezoidal section, whose top is provided with an aperture 21. The casing of a hereinafter described oscillator 22 is accommodated snugly in the aperture 21 so as to be fixed to the top 19 of the tank by means of fastening means (not shown). Each of the plates 14, 15, 16, or 17 has a tab 23, 24, 25, or 26 respectively at its top. The first pair of plates 14 and 15 are fixed by their tabs 23 and 24 to, but insulated from, the top 19 of the tank 11 by means of fastening means (not shown) so that they are held vertically. The second pair of plates 16 and 17 are fixed by their tabs 25 and 26 to, but insulated from, the lower surface of the oscillator 22 casing so that they are also held vertically. Thus these capacitor plates 14, 15, 16, and 17 are perpendicular to the surface 27 of the fuel 28 within the tank 11.

The first pair of plates 14 and 15 are rectangular and extend from near the bottom 29 of the tank 11 to near the top 19 thereof so as not to touch the top 19 and bottom 29 and also the side walls 30 and 31 of the tank 11. Thus the first pair of plates 14 and 15 are insulated from the surfaces 19, 29, 30, and 31 of the tank 11. The second pair of plates 16 and 17 are roughly rectangular with a trapezoidal upper part so as to be accommodated in the projection 20 in the top 19. These plates 16 and 17 extend from a position near the bottom 29 of the tank 11 to a position near the top of the projection 20 at the top 19 so as not to touch the surfaces 19, 29, 30 and 31 of the tank 11. Thus the second pair of plates 16 and 17 are insulated from the surfaces 19, 29, 30, and 31 of the tank 11 and also the oscillator 22 casing. Thus, when the tank 11 contains a certain amount of fuel, the capacitor 10 is partially immersed in the fuel and admits fuel into the gap thereof.

Since the dielectric constant of air differs from that of a fuel such as gasoline, the capacitance of the capacitor 10 depends strictly on the total area of the first and second sections 12 and 13 or that of the capacitor gap immersed in the fuel 28. Thus the capacitance of the capacitor 10 varies with the position of the surface 27 of the fuel 28. This allows an accurate measurement of the position of the surface 27 of fuel 28 or the amount of fuel 28 remaining in the tank 11 by determining the capacitance of the capacitor 10. Since the capacitor 10 extends from near the bottom to near the top of the tank 11, the capacitor 10 is partially immersed in the fuel in the range of fuel amount from nearly zero to nearly the maximum, or from nearly empty to nearly full for the tank 11, so that the amount of fuel remaining can always be determined in this range.

The total areas of the capacitor plates 14 and 15, or 16 and 17 are preferably large compared to the gap between the capacitor plates 14 and 15, or 16 and 17, because this configuration causes the capacitance of the capacitor 10 to have a substantially linear relationship to the area of the capacitor plates 14 and 15, or 16 and 17 immersed in the fuel. The capacitor plates 14, 15, 16, and 17 are preferably so designed that the areas thereof immersed in the fuel changes linearly with the amount of fuel 28 remaining in the tank 11, in order to make the capacitance of the capacitor 10 vary linearly with the amount of fuel 28 remaining in the tank 11. These linear relationships facilitate the measurement of the amount of fuel 28 remaining in the tank 11.

A certain amount, 0.1 to 0.5 l for example, of liquid water 32 tends to accumulate at the bottom of the tank 11 by condensation of gaseous water contained in air. Movement of the vehicle often causes a number of water droplets 33 to be formed separate from the accumulated water 32. The water droplets 33 may drift in the fuel 28. When a water droplet 33 enters the gap between the capacitor plates 14 and 15, or 16 and 17, the capacitance of the capacitor 10 increases since the dielectric constant of water is approximately forty times as large as that of gasoline, and consequently the measurement of the position of the surface of the fuel 28 is impaired. To prevent water droplets entering the gap between the capacitor plates, it has been thought to locate the capacitor at a distance from the bottom of the tank since the water droplets tend to fall by gravitation and thus usually drift near the bottom. However this method is impractical because small amounts of fuel remaining in the tank 11, for example 5 to 7 l for the tank in which the fuel level increases at a rate of 5 mm/l, must be measured.

Figure 2:
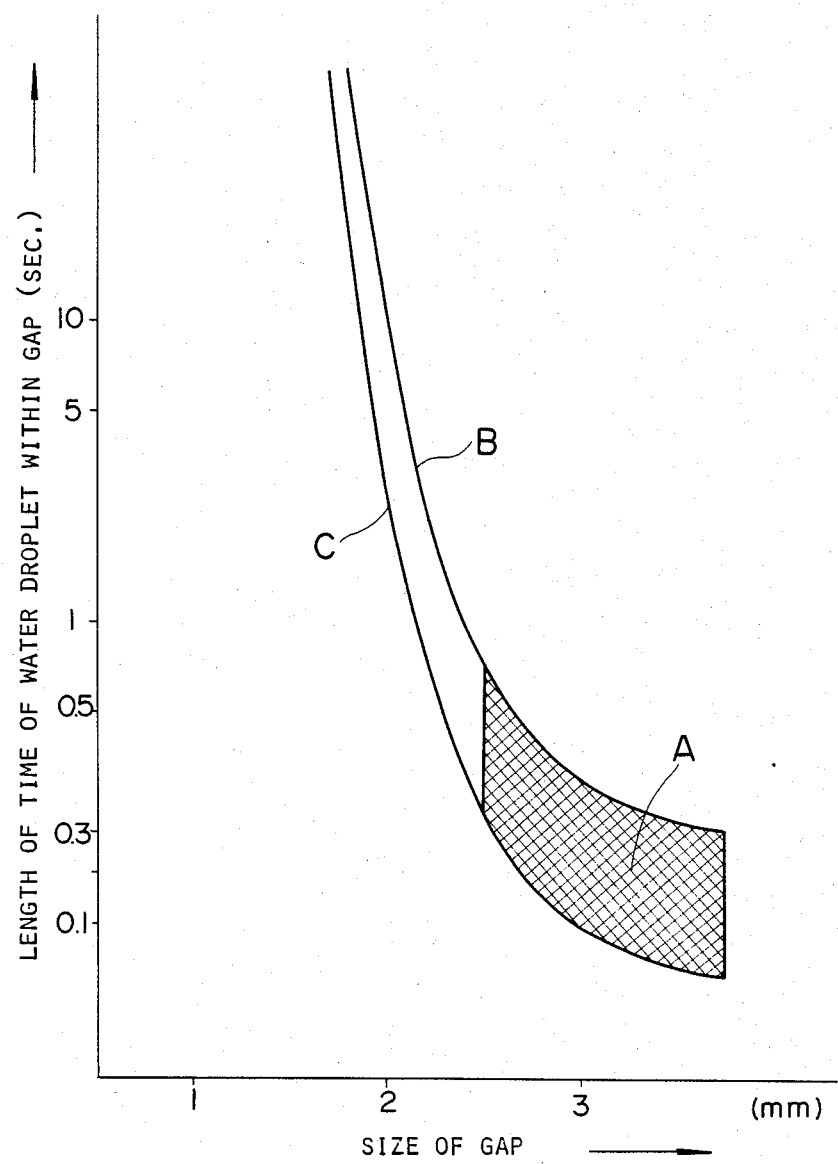
FIG. 2 is a graph showing the length of time during which a water droplet remains in the gap of the capacitor FIG. 1, against the size of the gap, wherein experimental data is positioned between the curves B and C.

As illustrated in FIG. 2, an experiment with regular gasoline used as fuel shows that the length of time during which a water droplet remains in the gap, or the period of time when a water droplet enters the gap to the time when the water droplet falls out of the gap, decreases according to the size of the gap. The experimental data is positioned between the curves B and C. Thus, widening the gap facilitates the fall of the water droplet in the gap. In the experiment, when the gap is 3 mm, the period during which a water droplet remains in the gap is very short, about 0.1 to 0.3 seconds for example under various normal vehicle driving conditions. The frequency of a water droplet entering the gap and remaining in the gap for a relatively long time, approximately 0.3 second for example, is about twice per minute. Therefore, when the gap is set at 3 mm, the capacitance of the capacitor can be measured by a time-averaged measurement over a relatively short period since a water droplet entering the gap does not influence the measurement of the capacitance substantially. For example, when the period chosen for the time-averaged measurement of the capacitance is 60 seconds, the error in the measurement due to water droplets entering the gap and remaining in the gap for about 0.3 seconds is approximately one percent and is thus negligible, because it occurs only twice a minute. In conclusion, the gap of the capacitor is preferably of a size corresponding to the cross-hatched region A in FIG. 2, i.e. 2.5 to 4 mm for regular gasoline. This gap of 2.5 to 4 mm may also prevent the occurence to short circuits in the capacitor 10 due to corrosion thereof.

Figure 3:
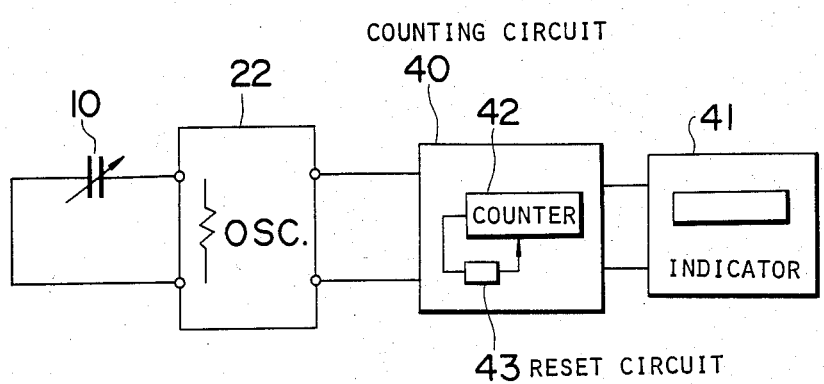
FIG. 3 is a block diagram of the fuel gauge of FIG. 1.

As best illustrated in FIG. 3, an oscillator 22, a counting circuit 40, and an indicator 41 are provided to measure the capacitance of the capacitor 10. The oscillator 22 includes an astable multivibrator producing a pulse train whose frequency varies with the capacitance of the capacitor 10. The counting circuit 40 is connected to the oscillator 22 to count the pulses from the oscillator 22. The counting circuit 40 consists of a counter 42 and a resetting circuit 43. The counter 42 counts the pulses from the oscillator 22. The resetting circuit 43 resets the counter 42, every time a relatively long period compared to the time during which a water droplet remains in the capacitor gap, for example one minute, passes. Thus the counter 42 measures the time-averaged frequency of the pulse train from the oscillator 22 over a period of one minute. The indicator 41 is connected to the counting circuit 40 to display the output signal therefrom indicative of the frequency of the pulse train from the oscillator 22 and thus the time-averaged capacitance of the capacitor 10 over a period of one minute. The indicator 41 is preferably made up of a seven segment numerical display arrangement indicating the capacitance of the capacitor 10 in terms of the amount of fuel remaining in the tank 11.

Figure 4:
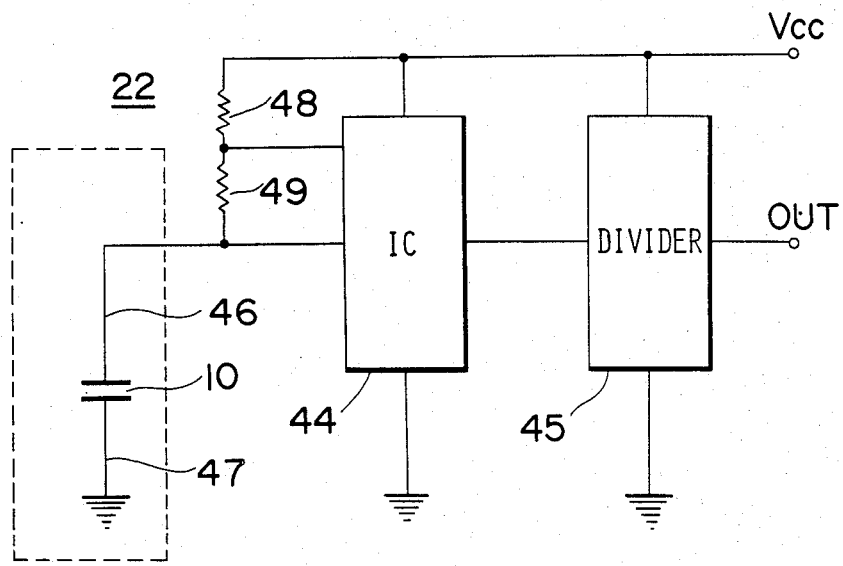
FIG. 4 is a block-diagrammatic view of the oscillator of FIG. 1.

As illustrated in FIG. 4 the oscillator 22 is made of a commercially available integrated circuit chip 44 designed for a monostable multivibrator with a small modification in the conventional way, and a frequency divider 45. The integrated circuit chip 44 is located just above the capacitor 10, and is connected thereto by means of leads 46 and 47 which are sufficiently short to decrease stray capacitance. The chip 44 is also connected to resistors 48 and 49 to constitute an astable multivibrator along with the capacitor 10, so that the resistors 48, 49 and the capacitor 10 may determine the oscillating frequency of the multivibrator. In this case, the frequency of the pulse train produced by the astable multivibrator is determined by the following equation:

$$f = \frac{1.44}{(R_A + 2R_B) \cdot C},$$

where f is the frequency; $R_A$ is the resistance of the resistor 48; $R_B$ is the resistance of the resistor 49; and C is the capacitance of the capacitor 10. The divider 45 is connected to the integrated circuit chip 44 to divide the frequency of the pulse train by $2^{14}$.

Figure 5:
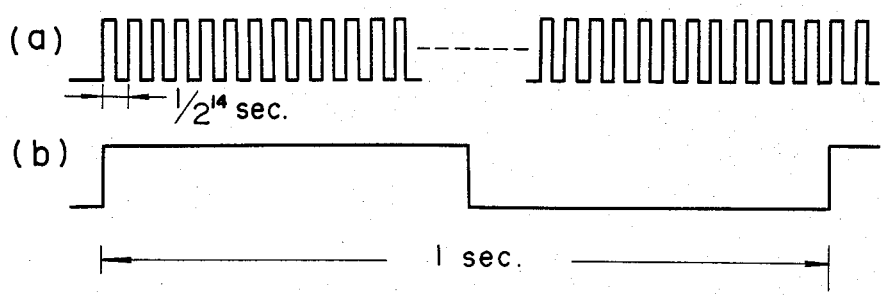
FIG. 5 is a timing chart of output signals from the astable multivibrator and the frequency divider of FIG. 4, where wave form (a) designates the output of the astable multivibrator and wave form (b) designates that of the frequency divider.

The parameters are preferably designed for regular gasoline as follows: the total area S of the capacitor plates 14 and 16, and 15 and 17 is about 0.1 m$^2$ while the gap d between the capacitor plates 14 and 15, or 16 and 17, is 3 mm. The capacitance C of the capacitor 10 thus varies from 500 to 1000 pF corresponding to the conditions from empty to full of the tank 11, since regular gasoline has a dielectric constant $\epsilon = 2 \times 8.85 \times 10^{-12}$ F/m, and C = $\epsilon$S/d in a parallel flat plate capacitor. In practice, $R_A + 2R_B$ is preferably around 100 K$\Omega$, and therefore f is equal to approximately 10 KHz. For example, when $R_A + 2R_B = 180$ K$\Omega$ and C = 500 pF, the integrated circuit chip 44 outputs a pulse train with a frequency of about 16 KHz as shown by wave form (a) in FIG. 5. The divider 45 then divides the frequency of the pulse train by $2^{14}$ to convert the same into a relatively low-frequency pulse train with a frequency of about 1 Hz as shown by wave form (b) in FIG. 5.

Figure 6:
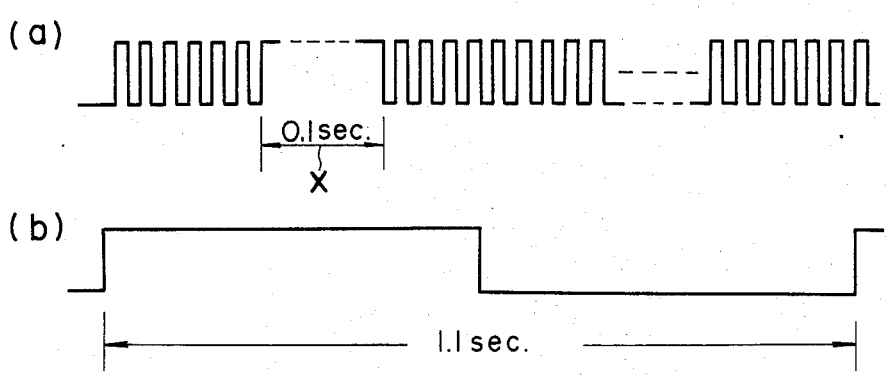
FIG. 6 is a timing chart similar to that of FIG. 5 under the condition where a water droplet enters the gap of the capacitor and remains in it during a period X.

When a water droplet is in the capacitor gap, the frequency of the pulse train produced by the integrated circuit chip 44 decreases drastically since the capacitance of the capacitor 10 increases, or the oscillating operation of the astable multivibrator of the chip 44 is suspended since the resistance between the capacitor plates drops sharply. For example, when a water droplet remains in the gap for 0.1 second provided that the normal frequency of the pulse train produced by the astable multivibrator is 16 KHz, the period of the frequency-divided pulse train increases approximately from 1.0 to 1.1 seconds as shown by wave form (b) in FIG. 6, because the astable multivibrator outputs no pulses during the time X when the water droplet remains in the capacitor gap as is shown by wave form (a) in FIG. 6. Thus, if a water droplet enters the capacitor gap once a minute and remains in it for 0.1 second, error in the determination of the capacitance of the capacitor 10 is given by 0.1/60, or approximately 0.17 percent. Even when a water droplet enters the gap twice a minute; the first remaining in it for 0.3 seconds; and the second for 0.1 seconds, the error is given by 0.4/60, approximately 0.7 percent. These errors are negligible in the measurement of fuel remaining in the tank of the vehicle driven under normal conditions.

FIG. 7 shows a second embodiment of the present invention, wherein similar or corresponding elements are designated by the same numerals as those in FIG. 1 to omit descriptions thereof. A tubular capacitor 60 is located vertically within a fuel tank 11 and is affixed to the lower surface of an insulating disk 61 fitted into an aperture 21 in the top 19 of the tank 11. The capacitor 60 is of such a height that the lower end of the capacitor 60 does not touch the botom of the tank 11 in its affixed condition so as to be insulated from the tank 11. The capacitor 60 consists of concentrically arranged inner and outer conductive cylinders 62 and 63 forming therebetween a small gap of predetermined size by means of insulating spacers (not shown). The capacitor 60 is open at its lower end to admit the fuel 28 into the capacitor gap. The capacitor 60 is electrically connected, by means of leads (not shown) through the insulating disk 61, to an oscillator 22 mounted on the disk 61. The capacitance of the capacitor 60 varies with the position of the surface of the fuel or the total area of the capacitor 60 immersed in the fuel. This capacitance is determined by a measuring device composed of the oscillator 22, a counting circuit 40, and an indicator 41 to measure the amount of fuel remaining in the tank 11.

It should be understood that further modifications and variations may be made in the present invention without departing from the spirit and scope of the present invention as set forth in the appended claims.

What is claimed is:

1. A fuel gauge for an automotive vehicle, comprising:
   (a) a tank containing fuel;
   (b) first and second conductive elements forming a capacitor, the first and second conductive elements being so arranged as to form therebetween a gap to be insulated from each other, the capacitor being located within the fuel tank so as to admit fuel into the gap thereof, whereby the capacitance of the capacitor varies with the position of the surface of the fuel, the gap of the capacitor being of a predetermined size allowing water droplets to fall out of the gap within a predetermined time period; and
   (c) a structural means for reducing inaccuracies in fuel measurement due to temporary presence of water droplets within said gap of said capacitor, including
   timing means comprising an arrangement of said conductive elements and the gap therebetween for defining said time period for a water droplet to pass through said gap, and
   a measuring means electrically connected to the capacitor for determining a time-averaged capacitance of the capacitor over a time duration in excess of said time period, thereby to reduce effects of a temporary presence of water droplets within said gap.

2. A fuel gauge as defined in claim 1, wherein the gap of the capacitor is 2.5 to 4 mm when the fuel is regular gasoline.

3. A fuel gauge as defined in claim 2, wherein the measuring device determines the time-averaged capacitance of the capacitor over a period of one minute.

4. A fuel gauge for an automotive vehicle, comprising:
   (a) a tank containing fuel;
   (b) first and second conductive elements forming a capacitor, the first and second conductive elements being so arranged as to form therebetween a gap to be insulated from each other, the capacitor being located within the fuel tank so as to admit fuel into the gap thereof, whereby the capacitance of the capacitor varies with the position of the surface of the fuel, the gap of the capacitor being of a predetermined size allowing water droplets to fall out of the gap within a predetermined time period;
   (c) means, including the capacitor, for producing pulses at a frequency which depends on the capacitance of the capacitor; and
   (d) means for counting the pulses from the pulse producing means during a preset length of time in excess of said predetermined time period and producing, in accordance with the number of the counted pulses, a signal which depends on the frequency of the pulses and thus on the position of the surface of the fuel,
   whereby effects of water droplets on fuel measurements are reduced.

5. A fuel gauge as defined in claim 4, wherein the first and second conductive elements are made up of parallelly arranged first and second flat plates.

6. A fuel gauge as defined in claim 4, wherein the first and second conductive elements are made up of concentrically arranged inner and outer cylinders.

7. A fuel gauge as defined in claim 4, wherein the gap of the capacitor is 2.5 to 4 mm in the case where the fuel is regular gasoline.

8. A fuel gauge as defined in claim 4, wherein the capacitor and the remainder of the means for producing pulses are connected by means of relatively short leads.

9. A fuel gauge as defined in claim 8, wherein the preset length of time is one minute.

10. A fuel gauge as defined in claim 4, further comprising means for displaying the signal dependent on the frequency of the pulses.

11. A fuel gauge as defined in claim 4, wherein the means for producing pulses comprises an astable multivibrator including the capacitor and producing primary pulses at a frequency which depends on the capacitance of the capacitor, and a frequency divider reducing the frequency of the primary pulses and producing secondary pulses at a frequency lower than and proportional to the frequency of the primary pulses, the pulses produced by the means for producing pulses comprising said secondary pulses.

12. A fuel gauge as recited in claim 4, wherein the counting means comprises a counter connected to the means for producing pulses for counting the pulses therefrom, and a resetting circuit connected to the counter for resetting the counter periodically.

13. A fuel gauge as recited in claim 4, wherein the counting means repeats the counting operation.

14. A fuel gauge for an automotive vehicle comprising:
- a capacitor disposed within a fuel tank and arranged to admit fuel to a gap between capacitive plates thereof,
  - pulse producing means incorporating said capacitor for producing a plurality of pulses at a frequency determined by the capacitor;
- dividing means connected to said pulse producing means and receiving said plurality of pulses therefrom for producing an output pulse train at a reduced frequency,
- counting means connected to said dividing means for counting pulses in said output pulse train during a fixed time period thereby to provide a count representative of the pulses produced by said pulse producing means and of a time average capacitance of said capacitor during said fixed time period;
- means for reducing the effects of foreign material in the fuel tank on fuel measurement including timing means for providing passage of a particle of the foreign material through the gap between said capacitive plates in a time duration substantially shorter than said fixed time period;
- indicating means connected to said counting means for providing an indication of the time averaged capacitance of said capacitor during said fixed time period; and
- a fixed time period resetting means, connected to said counting means, for repeatedly resetting said counting means at time instants separated from one another by said fixed time period,
- whereby time averaged indications representative of said capacitance of said capacitor are obtained over time periods substantially longer than said time duration and thus effects of said foreign material on the indicated capacitance and hence fuel measurements are reduced.

15. A fuel gauge for an automotive vehicle, comprising:
(a) a tank containing fuel;
(b) first and second conductive elements forming a capacitor disposed in the tank, the first and second conductive elements defining a vertically-extending gap therebetween and being electrically insulated from each other via the gap, the capacitor defining an opening at the bottom of the gap so that the fuel can enter and leave the gap via the opening, whereby the capacitance of the capacitor varies with the level of the fuel or the amount of the fuel remaining in the tank, the gap having a predetermined size and magnitude determining a time duration during which a water droplet remains within the gap, thereby determining a time period during which a water droplet affects the capacitance of the capacitor; and
(c) a measuring device electrically connected to the capacitor for determining an average value of the capacitance of the capacitor over a predetermined timing interval and thereby measuring the level of the fuel or the amount of the fuel remaining in the tank, said measuring device operative for determining said timing interval to be longer by a predetermined value than said time duration such that the effects of water droplets on the capacitance and hence on the measurement of the level of the fuel or the amount of the fuel remaining in the tank can be negligible.

* * * * *